Sept. 8, 1925.

H. W. LAVIGNE 1,552,992

BRAKE

Filed Sept. 15, 1924

Inventor:
Henry W. Lavigne
By Attorneys
Southgate & Southgate

Patented Sept. 8, 1925.

1,552,992

UNITED STATES PATENT OFFICE.

HENRY W. LAVIGNE, OF WORCESTER, MASSACHUSETTS, ASSIGNOR TO ASSAF G. ABYSALH, OF WORCESTER, MASSACHUSETTS.

BRAKE.

Application filed September 15, 1924. Serial No. 737,639.

*To all whom it may concern:*

Be it known that I, HENRY W. LAVIGNE, a citizen of the United States, residing at Worcester, in the county of Worcester and State of Massachusetts, have invented a new and useful Brake, of which the following is a specification.

This invention relates to an automobile brake. The principal object of the invention is to provide a construction in which the wear on the operating part of the brake will not prevent the full action of the brake and the parts will not have to be replaced until greatly worn; also to improve the construction and durability.

Reference is to be had to the accompanying drawings in which—

Figure 1:
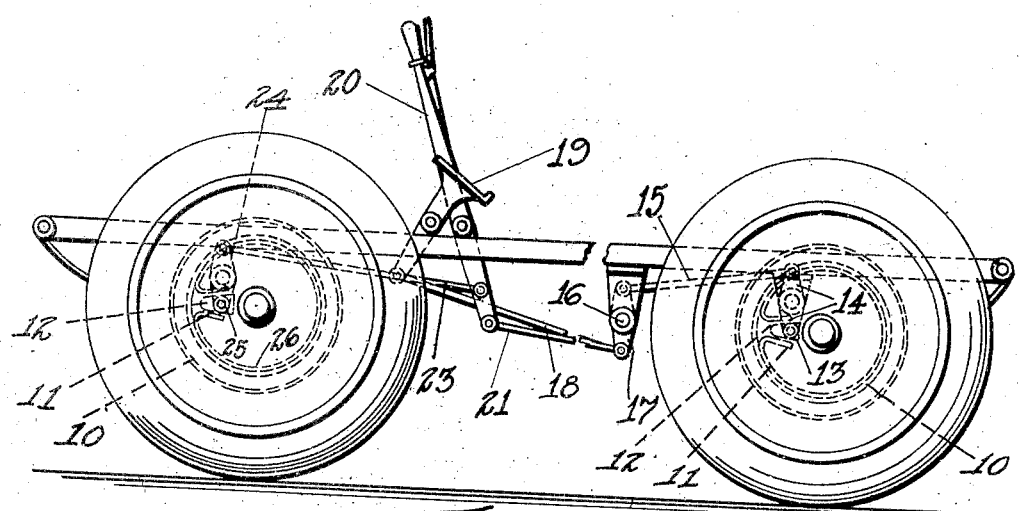
Fig. 1 is a side view of a brake mechanism constructed in accordance with this invention and shown as applied to an automobile.
Figure 2:
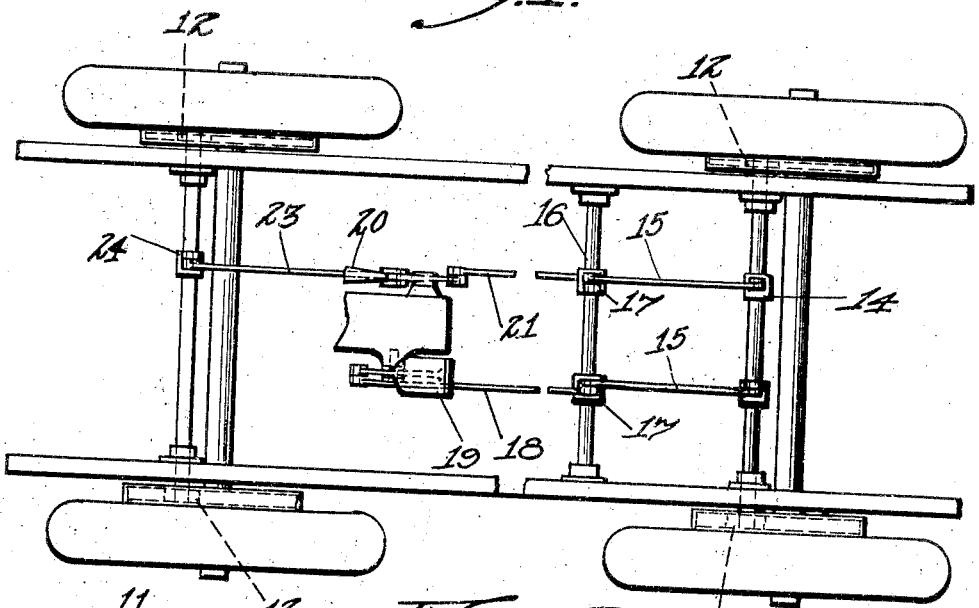
Fig. 2 is a plan of the necessary parts of the car and the brake mechanism.
Figure 3:
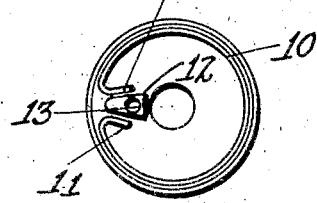
Fig. 3 is an end view of the brake shoe and expanding part.

As heretofore constructed, the brake shoe is expanded by means of a square shaft located between its ends and adapted to be turned for that purpose. When the corners of this shaft are worn off there is no way to make this brake again operative except by taking out the shaft and replacing it ordinarily.

The principal object of the invention is to provide an arrangement in which it will take much greater wear to render a brake inoperative than has been the case heretofore and in which the wear, even when it does get so bad as to destroy the value of the brake, can be taken up in a very simple way without replacing the main parts of the brake operating mechanism. I have shown the invention as applied to an expansible shoe 10 of an ordinary brake construction without modifications except that the ends 11 of the shoe are extended so as to diverge and form a larger wedge-shaped space than has been the case heretofore.

For the purpose of forcing the ends 11 apart, I provide a wedge 12 of the same angle as the space between the ends. This wedge moves radially and it will be seen that the long slanting surfaces will stand a good deal more wear than has been the case with the square shafts ordinarily used and that when this wedge does get so worn out that it is of no further use, it can be replaced by a new one without dismantling or throwing away any of the parts except the wedge itself.

For the latter purpose each wedge is mounted on a stud 13 fixed on an arm within the brake band and fixed to the end of a transverse shaft. This shaft has two arms 14 thereon each connected by a link 15 with a lever 17 pivoted on a shaft 16. One lever 17 is connected by a link 18 with a brake pedal 19. If it is desired, the emergency brake lever 20 can also be connected by a link 21 with the other lever 17 so that if there is not leverage enough in the foot pedal the two brakes can be applied more forcibly by means of the emergency brake lever.

Another addition that can be made is to provide a link 23 connected with the lower end of the emergency brake lever and connected by a lever 24 with another wedge 25 for operating front wheel brakes 26.

It will be seen that it will take more wear to wear out these parts than has been the case heretofore and that they can be more easily replaced so that it adds to the durability and reduces the cost of repairs.

Although I have illustrated and described only a single form of the invention, I am aware of the fact that modifications can be made therein by any person skilled in the art without departing from the scope of the invention as expressed in the claim.

Therefore I do not wish to be limited to all the details of construction herein shown and described, but what I do claim is:—

In an automobile brake, the combination of two brake shoes each having integral operating ends near each other and diverging from each other inwardly toward the center of the wheel, a wedge located between the diverging ends of each brake shoe and having substantially the same angle as the diverging ends and movable inward between them radially, a transverse shaft, means on said shaft within the brake shoes connected with both wedges to operate them simultaneously, a pair of arms fixed on said shaft, a pair of links connected with said arms, a second transverse shaft, a pair of levers freely pivoted on the second shaft, a foot brake lever connected with one of said levers for operating it and consequently operating both brakes, and an emergency hand lever connected with the other lever for operating it and also operating both brakes.

In testimony whereof I have hereunto affixed my signature.

HENRY W. LAVIGNE.